United States Patent [19]

Eggen

[11] Patent Number: 4,729,575
[45] Date of Patent: Mar. 8, 1988

[54] COMPENSATED TRAILER HITCH

[76] Inventor: Marvin P. Eggen, 103 12th St., Watertown, S. Dak. 57201

[21] Appl. No.: 829,105

[22] Filed: Feb. 14, 1986

[51] Int. Cl.⁴ .............................................. B62D 53/06
[52] U.S. Cl. ........................... 280/438 R; 280/446 R; 280/468; 280/DIG. 14
[58] Field of Search ........... 280/432, 467, 468, 438 R, 280/438 A, 447, 471, 419, 426, DIG. 9, DIG. 14, 441, 446 R

[56] References Cited

U.S. PATENT DOCUMENTS

| | | | |
|---|---|---|---|
| 2,557,471 | 6/1951 | Romig et al. | 280/471 |
| 2,979,341 | 4/1961 | Thomas | 280/468 X |
| 3,618,983 | 11/1971 | Forse | 280/432 |
| 3,917,314 | 11/1975 | Neal | 280/432 |

FOREIGN PATENT DOCUMENTS 711219  9/1941  Fed. Rep. of Germany ...... 280/468

*Primary Examiner*—David M. Mitchell
*Assistant Examiner*—Mitchell J. Hill
*Attorney, Agent, or Firm*—Berman, Aisenberg & Platt

[57] ABSTRACT

Apparatus for controlling the position of a trailer with respect to a tractor is disclosed. A control mechanism is attached to the steering mechanism of the tractor and produces an output corresponding to the position of the steering mechanism. A movable hitch is attached to the tractor to receive a hitch on the trailer. The hitch on the tractor is movable with respect to the tractor in opposed directions transverse to the center line of the tractor. Hydraulic cylinders are driven by the central mechanism to move the hitch in response to the position of the steering mechanism.

1 Claim, 4 Drawing Figures

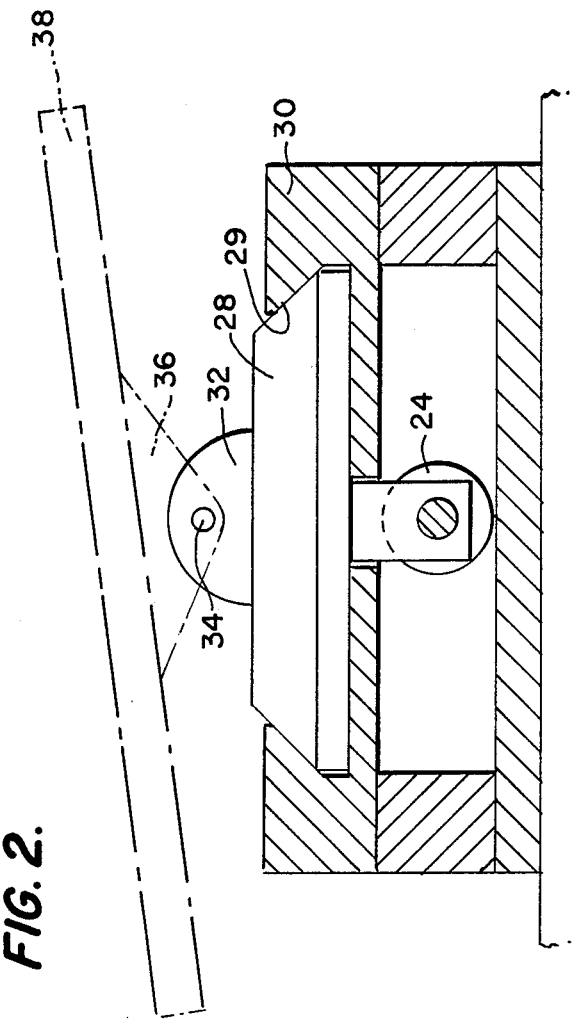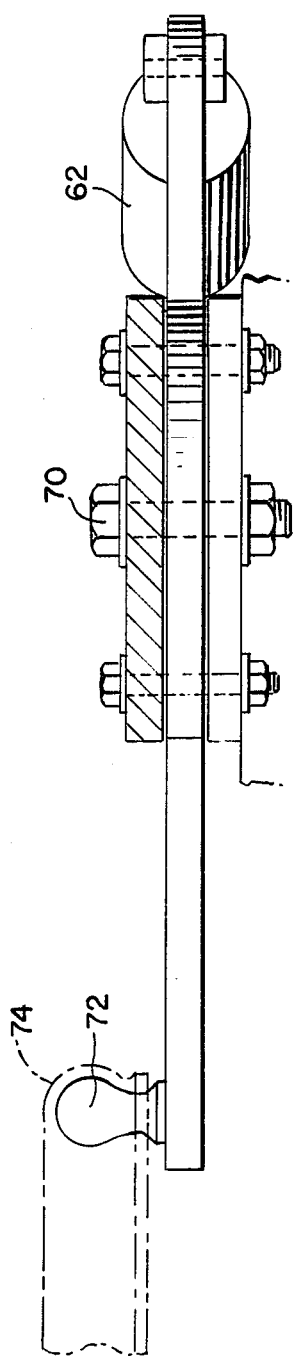

4,729,575

COMPENSATED TRAILER HITCH

FIELD OF THE INVENTION

The present invention relates to a vehicle towing mechanism, particularly a compensating trailer hitch for tractor-trailer combinations.

BACKGROUND OF THE INVENTION

Jack-knifing is a serious problem for tractor-trailer combinations, and existing systems for solving the problem have not been successful.

Several prior art patents have addressed towing problems. U.S. Pat. No. 1,372,677 (Dellett et al.) describes a tractor steering hitch for farm use wherein a slidable hitch is used on a trailer to cause its wheels to follow in the tracks of the tractor in passing around curves. While this is of some help in forcing a trailer to follow a tractor, the trailer does not move transversely of the tractor until the angle between the tractor and trailer changes. Turning the front wheels of the tractor while the combination is stationary has no effect on the position of the trailer. In U.S. Pat. No. 3,063,739 (Davies) a fifth wheel plate is fixed to a tractor chassis on its center line. The device incorporates two vertical axes spaced rearwardly from one another on the longitudinal axis of the trailer, and the fifth wheel plate is locked to, and swings about, either of these axes. There is no horizontal movement of the fifth wheel plate or the hitch means.

Systems shown in U.S. Pat. No. 2,922,660 (Haugland et al.), U.S. Pat. No. 4,153,132 (Biedebach) and U.S. Pat. No. 4,212,483 (Howard) consider improvements in connections between the tractor and the trailer, but none of these systems would efficiently compensate for the forces which cause skidding or jack-knifing.

U.S. Pat. No. 4,204,700 (Haines) shows an anti-jackknife apparatus which is hydraulically controlled but which merely limits the turning angle of the trailer to cause it to follow the tractor. U.S. Pat. No. 4,313,615 (Simon) describes a system in which a steering mechanism is connected to a pivotable disk which controls hydraulic cylinders placed between a forward member and a rearward member of an articulated vehicle so that angular movement of the rearward member is severely limited. U.S. Pat. No. 2,461,212 (Hanna) concerns maintaining the alignment of a tractor and a trailer. An arrangement is provided for allowing the trailer to turn with respect to the tractor only when the tractor is intentionally turning a corner.

SUMMARY OF THE INVENTION

When a tractor is towing a trailer in a straight line, the longitudinal axes of the two vehicles should nominally remain aligned. When the trailer pivots about the tractor hitch the longitudinal axes of the vehicles are out of alignment, and if the included angle between these axes becomes too small the tractor can no longer continue to move in its proper direction, can not pull the trailer into alignment, and jack-knifing occurs. In a typical situation, jack-knifing takes place when the tractor and trailer axes are not aligned and the tractor brakes too suddenly, the trailer's brakes fail, or one of the vehicles skids unexpectedly, suddenly throwing momentum of the trailer against the rear of the tractor at an angle which causes the tractor to rotate uncontrollably.

According to this invention, a simple device is provided to shift the location at which the trailer is connected to the tractor in response to the steering of the tractor to eliminate or greatly reduce the rotational force applied to the tractor by the trailer. A change in direction of the steering mechanism of the tractor causes a hitch pivot point between the two vehicles to move laterally in a direction opposite that of the steering change, thus shifting the weight of the trailer and the point at which momentum is transferred in the direction opposite to that in which the steering mechanism of the tractor is turned. For example, when the tractor skids, a driver will automatically turn the steering mechanism of the tractor into the skid to correct the skid. Using the apparatus of the invention, the point of connection of the trailer will be automatically shifted in the direction opposite to the direction in which the steering is turned, to aid in realignment of the longitudinal axes.

The hitch pivot point may be either a pivoted ball hitch which can pivot from side to side, or a fifth wheel pivot means which is anchored to a sliding table which moves laterally.

An object of the invention is to provide an apparatus for controlling the lateral position of a trailer hitch with respect to a tractor.

Another object of the invention is to provide an apparatus for steering a tractor-trailer combination wherein the lateral location of the hitch is dependent upon the orientation of the steering wheels of the tractor.

Another object of the invention is to provide an apparatus for preventing jack-knifing by automatically shifting the weight of the trailer in a direction opposite to the direction of turning of the steering mechanism of the trailer.

BRIEF DESCRIPTION OF THE DRAWINGS

FIG. 2 is an enlarged sectional view taken on line 2—2 of FIG. 1.

FIG. 4 is an enlarged sectional view taken on line 4—4 of FIG. 3.

DETAILED DESCRIPTION OF THE INVENTION

Figure 1:
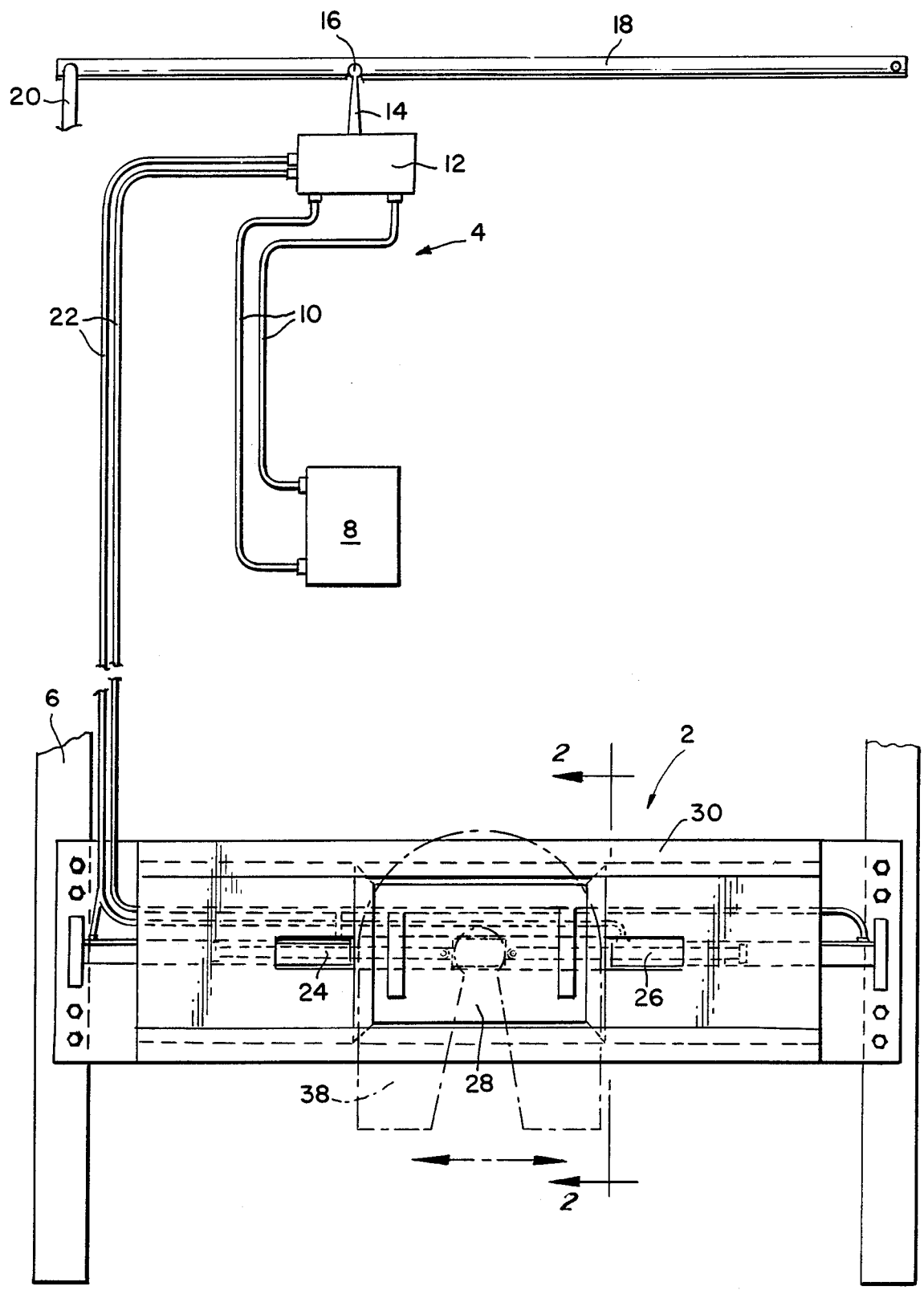
FIG. 1 is a diagrammatic plan view of a floating fifth wheel trailer hitch of the invention.

Referring now to the drawings, FIG. 1 shows a hitch assembly 2 connected to steering assembly 4, both the hitch assembly 2 and the steering assembly 4 being connected to frame 6 of a tractor (not shown). Steering assembly 4 comprises oil pressure pump 8 connected by hydraulic lines 10 to control valve 12. Hydraulic control arm 14 connects control valve 12 by control linkage 16 to tie rod 18 which is in turn connected to front wheels (not shown) of the tractor. Pitman shaft 20, which is also part of steering assembly 4, drives tie rod 18 to steer the tractor by adjusting the angular orientation of the wheels. Hydraulic lines 22 connect control valve 12 to hydraulic cylinders 24 and 26, located at the rear of the tractor vehicle. Hydraulic cylinders 24 and 26 are preferably double-acting hydraulic cylinders.

Referring now to FIG. 2, sliding anchoring table 28 is mounted in slot 29 in guide frame 30. Sliding table 28 is connected to hydraulic cylinders 24 and 26 is driven in opposed lateral directions by these cylinders. Table 28 includes clevis 32 which engages mounting 36 at pivot pin 34 to connect fifth wheel 38 to table 28. Fifth wheel 38 is thus caused to move back and forth in the directions shown by the arrows of FIG. 1 by means of sliding anchoring table 28. In other respects, fifth wheel 38 is conventional.

The movement of table 28 is controlled by steering assembly 4 of the tractor because control valve 12 is connected to tie rod 18. When the steering assembly 4 causes the front wheels of the tractor to turn in one direction, anchoring table 28 is caused to slide in guide frame 30 in the opposite direction. Because fifth wheel 38, to which the trailer is connected, is mounted on the sliding anchoring table 28, fifth wheel 38 moves in a direction opposite to the direction in which the wheels are turned. The front of the trailer likewise moves in the direction opposite to that in which the wheels of the tractor are turned.

Figure 3:
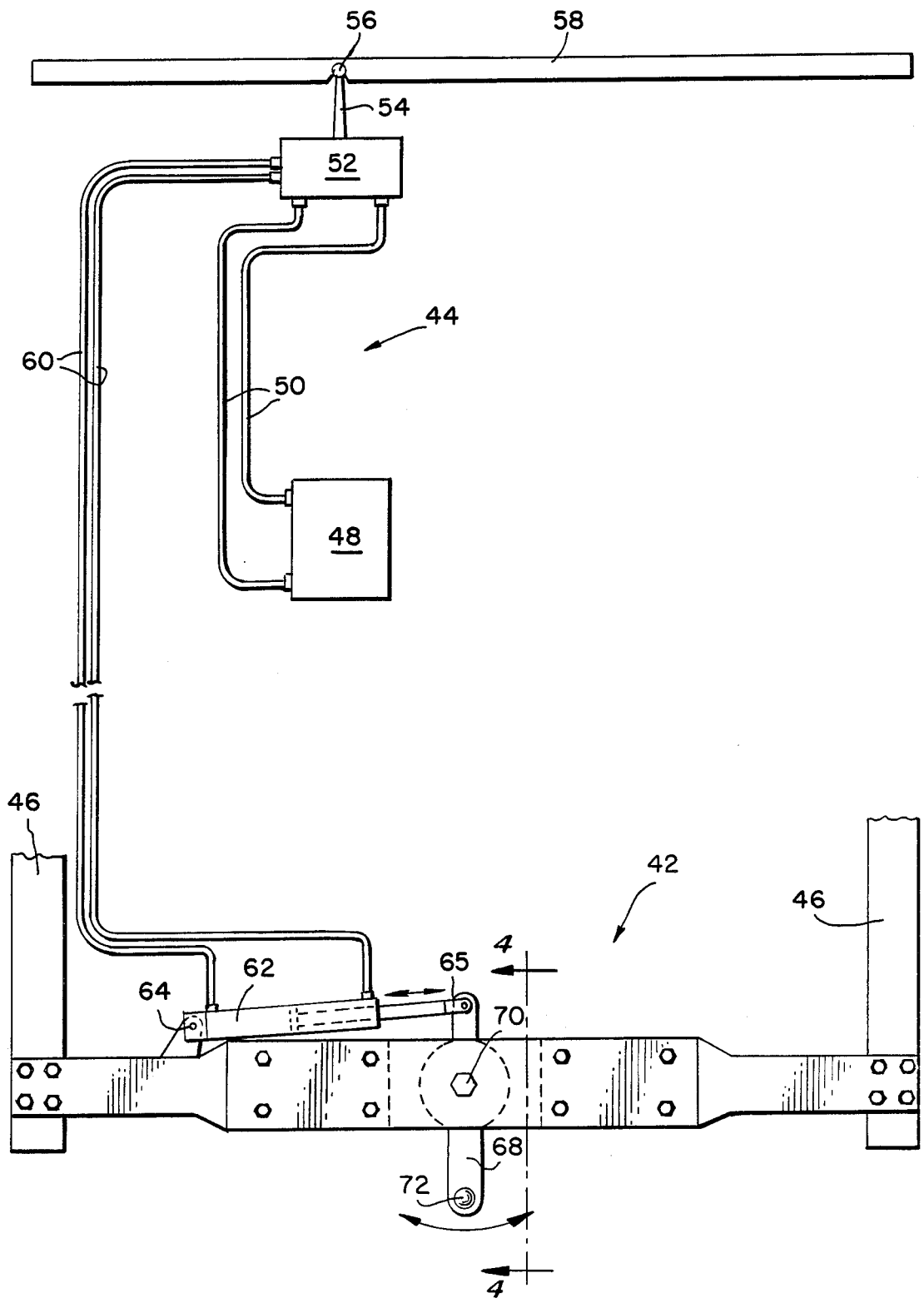
FIG. 3 is a plan view of a ball-type trailer hitch of the invention.

FIGS. 3 and 4 show a ball-type trailer hitch of the invention. Hitch assembly 42 is connected to steering assembly 44, both of these assemblies being mounted on tractor frame 46. Steering assembly 44 includes oil pressure pump 48 connected by hydraulic lines 50 to control valve 52. Control arm 54 connects control valve 52 via control linkage 56 to tie rod 58. Hydraulic lines 60 lead from control valve 52 to hydraulic cylinder 62. Hydraulic cylinder 62 is connected at its one end 64 to tractor frame 46 and, at its other end 65, to pivot bar 68 by means of cylinder pivot bolt 66. Pivot bar 68 is pivoted about center pivot bolt 70, and at its outboard end, pivot bar 68 carries trailer hitch ball 72. Trailer socket 74 (FIG. 4), attached to a trailer, is engagable over trailer hitch ball 72. It will be seen that pivot bar 68 can move as shown by the curved arrow about center pivot bolt 70 as the hydraulic cylinder 62 is actuated. Hydraulic cylinder 62 is preferably a double-acting hydraulic cylinder but multiple cylinders could be used to drive pivot bar 68 in opposite directions. Turning the tractor steering mechanism in one direction causes the pivot ball carrying the trailer hitch socket 65 to turn in an opposite direction.

It will be appreciated that the apparatus of the invention provides markedly increased safety and greatly reduces the risk of jack-knifing. For example, when driving down a road, if the rear end of a tractor begins sliding to the right, the driver will automatically turn the steering wheel to the right to correct this skid. With the apparatus of the invention, the hitch moves to the left which applies the weight and momentum of the trailer to the left of the tractor thus forcing the rear of the tractor to the left to assist in correcting the skid. In a similar manner, if the front end of the tractor begins to slide to the right, the driver will automatically turn the steering wheel to the left. This will cause the trailer to move to the right to pull the rear of the tractor to the right to correct the skid.

In a similar manner, the movable hitch assists in recovering from a trailer's skid.

Additionally, it will be appreciated that one advantage of the invention is that the weight of the trailer and the point of application of its momentum is shifted in response to a correcting action taken by the driver, and this means that immediate correction occurs. It is not necessary for the driver to have a separate control and to make an instantaneous decision as to the direction in which the hitch should be moved because the correction is automatically effected. Similarly, because corrections are made immediately, it is possible to provide small corrections very quickly thus avoiding a crisis situation.

Additionally, use of the trailer hitch of the invention eliminates confusion in backing a trailer because, by using the hydraulic steering mechanism described herein, the trailer backs up in the same direction and ratio as the backing powered vehicle.

The steering controlled trailer hitch can also be used for pulling trailers in tandem, simply by installing a hitch according to this invention to the rear of each leading trailer.

Variations and modifications may be effected within the scope of the invention as described above, and as defined in the appended claims.

What is claimed is:

1. Apparatus for correction of jack-knifing in a tractor-trailer comprising guide frame means extending transversely between first and second longitudinal frame members of a tractor, said guide frame means having slot means for slidingly receiving anchoring table means for linear movement along said guide frame means, said anchoring table means having a fifth wheel thereon for linear movement along said guide frame means with said anchoring table means, a first hydraulic cylinder extending between a first side of said anchoring table means and said first longitudinal frame member, a second hydraulic cylinder extending between a second side of said anchoring table means and said second longitudinal frame member, said first and second sides of said anchoring table means being opposite each other and said first and second hydraulic cylinders being arranged for applying directly opposed linear forces to said anchoring table means, a hydraulic pump, hydraulic control valve means for directing a flow of hydraulic fluid under pressure to a selected one of said first and second hydraulic cylinders in response to the position of a control lever, means connecting said control lever to a steering mechanism of said tractor for bi-directional movement therewith, and flow conduit means connecting said hydraulic control valve to said first and second hydraulic cylinders, wherein movement of said steering mechanism to direct said tractor in a first direction moves said control lever to cause said hydraulic control valve to supply hydraulic fluid to a selected one of said hydraulic cylinders to cause said anchoring table to move in an opposite direction.

* * * * *